(12) United States Patent
Suzuki

(10) Patent No.: US 12,711,986 B2
(45) Date of Patent: Aug. 18, 2026

(54) MAGNETIC DISK DEVICE HAVING PIEZOELECTRIC ELEMENT

(71) Applicants: Kabushiki Kaisha Toshiba, Tokyo (JP); Toshiba Electronic Devices & Storage Corporation, Tokyo (JP)

(72) Inventor: Yasuo Suzuki, Fujisawa Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 43 days.

(21) Appl. No.: 18/829,897

(22) Filed: Sep. 10, 2024

(65) Prior Publication Data

US 2025/0279118 A1 Sep. 4, 2025

(30) Foreign Application Priority Data

Feb. 29, 2024 (JP) ................................ 2024-029878

(51) Int. Cl.
*G11B 5/60* (2006.01)
*G11B 5/48* (2006.01)

(52) U.S. Cl.
CPC .......... *G11B 5/6058* (2013.01); *G11B 5/4886* (2013.01)

(58) Field of Classification Search
None
See application file for complete search history.

(56) References Cited

U.S. PATENT DOCUMENTS

| | | | | |
|---|---|---|---|---|
| 6,831,807 | B2 | 12/2004 | Koso et al. | |
| 7,141,911 | B2 | 11/2006 | Kita et al. | |
| 8,929,022 | B1 | 1/2015 | Huang et al. | |
| 2002/0097529 | A1* | 7/2002 | Sato | G11B 5/5552 |
| 2004/0135472 | A1* | 7/2004 | Kita | G11B 5/4873 |
| 2006/0082254 | A1* | 4/2006 | Kita | G11B 5/596 310/317 |
| 2010/0232069 | A1* | 9/2010 | Hata | G11B 5/4833 29/25.35 |
| 2011/0013319 | A1 | 1/2011 | Soga et al. | |
| 2016/0035968 | A1* | 2/2016 | Sakakura | G11B 5/4873 29/25.35 |
| 2019/0267032 | A1* | 8/2019 | Naniwa | G11B 5/4873 |
| 2025/0366371 | A1* | 11/2025 | Ol | H10N 30/045 |

* cited by examiner

*Primary Examiner* — William J Klimowicz
(74) *Attorney, Agent, or Firm* — Kim & Stewart LLP

(57) ABSTRACT

According to one embodiment, a magnetic disk device includes a magnetic disk, a gimbal, and a controller. The magnetic disk rotates around a first axis. The gimbal includes a magnetic head and a piezoelectric element. The piezoelectric element is deformed in accordance with an applied drive voltage to move the magnetic head. The controller applies a polarization voltage to the piezoelectric element to give spontaneous polarization to the piezoelectric element. The polarization voltage satisfies a relationship of $\Delta V=(2\pi f)A\cdot\Delta T<\Delta Vmax$, where "ΔV" is a voltage change amount of the polarization voltage per unit time, "f" is a frequency of the polarization voltage, "A" is an amplitude of the polarization voltage, "ΔT" is a time resolution of the polarization voltage, and "ΔVmax" is a voltage change amount per unit time that excites resonance of the gimbal in application to the piezoelectric element.

9 Claims, 7 Drawing Sheets

FIG.1

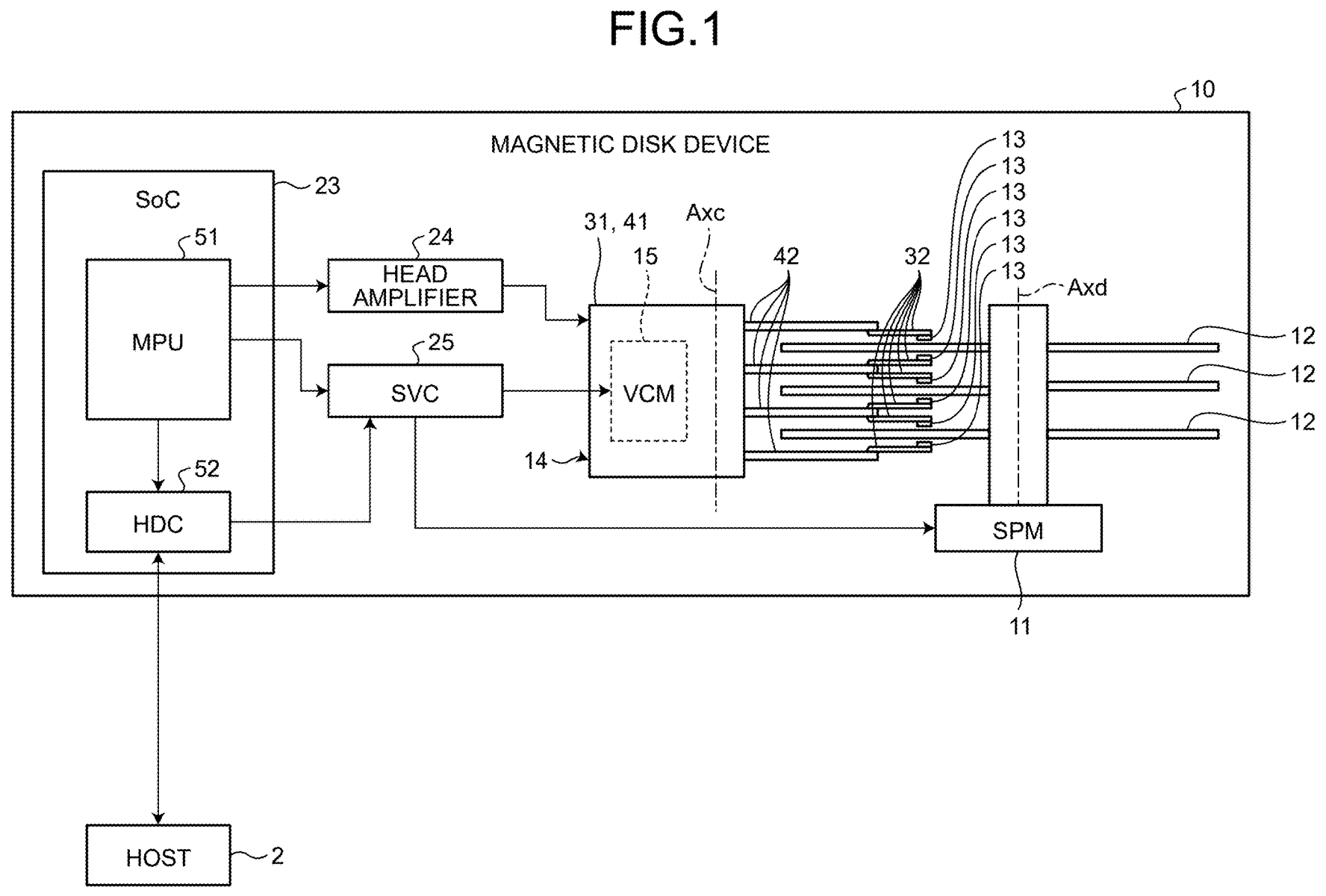

MAGNETIC DISK DEVICE 10
12
12
12
Axd
13
13
13
13
13
13
SPM
11
32
42
Axc
15
VCM
31, 41
14
24
HEAD AMPLIFIER
25
SVC
23
SoC
51
MPU
52
HDC
2
HOST

MAGNETIC DISK DEVICE HAVING PIEZOELECTRIC ELEMENT

CROSS-REFERENCE TO RELATED APPLICATIONS

This application is based upon and claims the benefit of priority from Japanese Patent Application No. 2024-029878, filed on Feb. 29, 2024; the entire contents of which are incorporated herein by reference.

FIELD

Embodiments described herein relate generally to a magnetic disk device.

BACKGROUND

A magnetic disk device, such as a hard disk drive, is provided with a gimbal, for example. The gimbal includes a part of a suspension, and a magnetic head and a piezoelectric element that are mounted on the suspension. When the piezoelectric element is supplied with a voltage, this element is deformed due to the inverse piezoelectric effect and adjusts the position of the magnetic head.

The spontaneous polarization of the piezoelectric element may disappear, when an excessive voltage is applied to the piezoelectric element due to electrostatic discharge, for example. The piezoelectric element that has lost its spontaneous polarization is given spontaneous polarization again, when the piezoelectric element is supplied with a high voltage, for example.

The piezoelectric element may generate resonance of the gimbal due to a high voltage applied thereto. The resonance may cause the magnetic head to shake. For example, when the piezoelectric element generates resonance of the gimbal on a data zone of the magnetic disk, the magnetic head floating over the surface of the magnetic disk could be jolted, which possibly causes the magnetic head to come into contact with the data zone. If the magnetic head is prevented from coming into contact with the data zone, the reliability of the magnetic disk device can be improved.

BRIEF DESCRIPTION OF THE DRAWINGS

FIG. 1 is an exemplary diagram illustrating a configuration of a magnetic disk device according to a first embodiment;

DETAILED DESCRIPTION

In general, according to one embodiment, a magnetic disk device includes a magnetic disk, a gimbal, and a controller. The magnetic disk is configured to rotate around a first axis. The gimbal includes a magnetic head configured to perform recording and reproducing of data with respect to the magnetic disk, and a piezoelectric element configured to be deformed in accordance with an applied drive voltage to move the magnetic head. The controller is configured to apply a polarization voltage to the piezoelectric element to give spontaneous polarization to the piezoelectric element. The polarization voltage satisfies a relationship of $\Delta V=(2\pi f) A\cdot\Delta T<\Delta V\max$, where "ΔV" is a voltage change amount of the polarization voltage per unit time, "f" is a frequency of the polarization voltage, "A" is an amplitude of the polarization voltage, "ΔT" is a time resolution of the polarization voltage, and "ΔVmax" is a voltage change amount per unit time that excites resonance of the gimbal in application to the piezoelectric element.

First Embodiment

Hereinafter, with reference to FIGS. 1 to 4, a first embodiment will be explained. It should be noted that, in the present specification, there is a case where a plurality of expressions are used, with reference to a constituent element according to an embodiment and description on the element. The constituent elements and description thereon are mere examples, and are not limited to the expressions given in the present specification. A constituent element may be identified with a name different from that in the present specification. Further, a constituent element may be described by using an expression different from that in the present specification.

In the following explanation, "to prevent" is defined as, for example, to prevent the occurrence of an event, action, or influence, or to reduce the severity level of an event, action, or influence. Further in the following explanation, "to restrict" is defined as, for example, to prevent movement or rotation, or to allow movement or rotation within a specified range while preventing movement or rotation beyond that specified range.

FIG. 1 is an exemplary diagram illustrating a configuration of a magnetic disk device 10 according to the first embodiment. The magnetic disk device 10 is a hard disk drive (HDD), for example. However, the magnetic disk device 10 may be another magnetic disk device, such as a hybrid HDD.

The magnetic disk device 10 can be connected to a host 2. The magnetic disk device 10 and the host 2 can communicate with each other in compliance with the Serial Attached SCSI (SAS) standard, for example. However, the standard of the communication path between the magnetic disk device 10 and the host 2 is not limited to this example.

The host 2 is a processor, personal computer, or server, for example. The magnetic disk device 10 can receive access commands (read commands and write commands) from the host 2.

Figure 2:
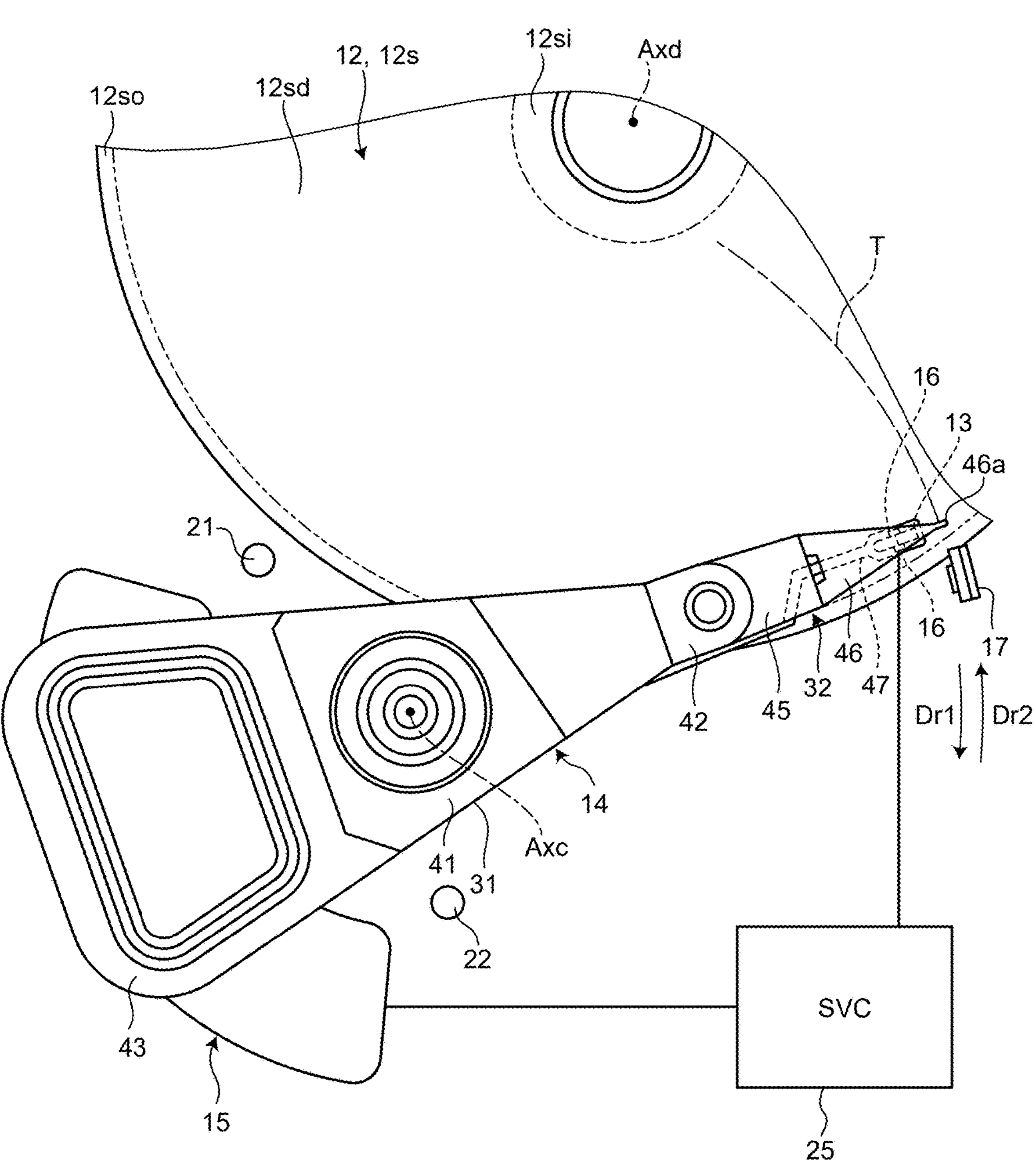
FIG. 2 is an exemplary plan view illustrating a configuration of the magnetic disk device in the first embodiment.

FIG. 2 is an exemplary plan view illustrating a configuration of the magnetic disk device 10 in the first embodiment. As illustrated in FIGS. 1 and 2, the magnetic disk device 10 includes a spindle motor (SPM) 11, a plurality of magnetic disks 12, a plurality of magnetic heads 13, an actuator 14, a voice coil motor (VCM) 15, a plurality of micro-actuators (MA) 16, a ramp load mechanism 17, an outer stopper 21, an inner stopper 22, a system-on-chip (SoC) 23, a head amplifier 24, and a servo controller (SVC) 25.

The magnetic heads 13 may also be referred to as sliders. Each of the MAs 16 is an example of a piezoelectric element. The ramp load mechanism 17 is an example of a ramp. The inner stopper 22 is an example of a stopper. The SVC 25 is an example of a controller. The SVC 25 may also be referred to as a servo combo.

As illustrated in FIG. 1, the magnetic disks 12 are held on the hub of the SPM 11 by a clamp, for example. The SPM 11 can rotate the magnetic disks 12 together around a central axis Axd. In other words, the magnetic disks 12 can rotate around the central axis Axd. The central axis Axd is an example of a first axis, and is the central axis of the magnetic disks 12, for example.

As illustrated in FIG. 2, each of the plurality of magnetic disks 12 includes a recording surface 12*s*. For example, each magnetic disk 12 is provided with recording surfaces 12*s* one on either side thereof. The recording surface 12*s* includes a data zone 12*sd*, an inner peripheral zone 12*si*, and an outer peripheral zone 12*so*.

The data zone 12*sd* is positioned between the inner peripheral zone 12*si* and the outer peripheral zone 12*so*, and data is recorded therein. The inner peripheral zone 12*si* is closer to the central axis Axd than the data zone 12*sd* and the outer peripheral zone 12*so*. The outer peripheral zone 12*so* is more distant from the central axis Axd than the data zone 12*sd* and the inner peripheral zone 12*si*.

The number of the magnetic heads 13 is set such that the plurality of magnetic heads 13 can access the recording surfaces 12*s* of the magnetic disks 12. Each of the magnetic heads 13 can be placed on corresponding one of the recording surfaces 12*s*. The magnetic head 13 floats over the recording surface 12*s* while the magnetic disk 12 rotates. Each of the plurality of magnetic heads 13 can perform data recording and data reproducing with respect to the data zone 12*sd* of the corresponding one of the recording surfaces 12*s*.

The actuator 14 includes a carriage 31 and a plurality of suspensions 32. The actuator 14 may include a plurality of carriages 31. The carriage 31 includes a block 41, a plurality of arms 42, and a holder 43.

The block 41 can rotate around a central axis Axc. The central axis Axc extends substantially in parallel to the central axis Axd and is distant from the central axis Axd. The number of arms 42 is set in accordance with the number of magnetic heads 13. The arms 42 protrude from the block 41 in a direction substantially perpendicular to the central axis Axc. The arms 42 extend substantially in parallel to each other. The holder 43 protrudes from the block 41 and is disposed on the side opposite to the arms 42.

The number of suspensions 32 is set in accordance with the number of magnetic heads 13. Each of the suspensions 32 includes a base plate 45, a load beam 46, and a flexure 47. The base plate 45 and the load beam 46 are made of stainless steel, for example.

The base plate 45 is attached to the tip of the arm 42. The load beam 46 is formed in the shape of a thin plate that can be elastically deformed. The load beam 46 is attached to the base plate 45 so as to extend from the base plate 45. The load beam 46 includes a lift tab 46*a* provided at the tip of the actuator 14.

The flexure 47 is a kind of flexible printed circuit board (FPC) and includes a plurality of insulating layers, a conductive layer, and a backing plate. The conductive layer is provided between two insulating layers, for example, and includes a plurality of wiring lines and a plurality of pads. The backing plate is made of stainless steel, for example, and reinforces the flexure 47.

The backing plate of the flexure 47 is attached to the load beam 46 by welding, for example. Each of the magnetic heads 13 is mounted on the flexure 47 near the tip of the corresponding one of the suspensions 32.

The VCM 15 includes a voice coil, a pair of yokes, and a magnet attached to the yokes. The voice coil is held on the holder 43. The VCM 15 can rotate the actuator 14 around the central axis Axc within a specified range. The actuator 14 rotates around the central axis Axc to move the magnetic heads 13 on the suspensions 32 with respect to the magnetic disks 12.

The VCM 15 can rotate actuator 14 in a first direction Dr1 and a second direction Dr2 around the central axis Axc. The second direction Dr2 is a direction opposite to the first direction Dr1. When the actuator 14 rotates in the first direction Dr1, the magnetic heads 13 are moved away from the central axis Axd. When the actuator 14 rotates in the second direction Dr2, the magnetic heads 13 are moved closer to the central axis Axd.

The VCM 15 moves the suspensions 32 and the arms 42 substantially in parallel to the recording surfaces 12*s* of the magnetic disks 12. In this embodiment, the VCM 15 moves the magnetic heads 13, with respect to the magnetic disks 12, substantially in a radial direction perpendicular to the Axd.

Figure 3:
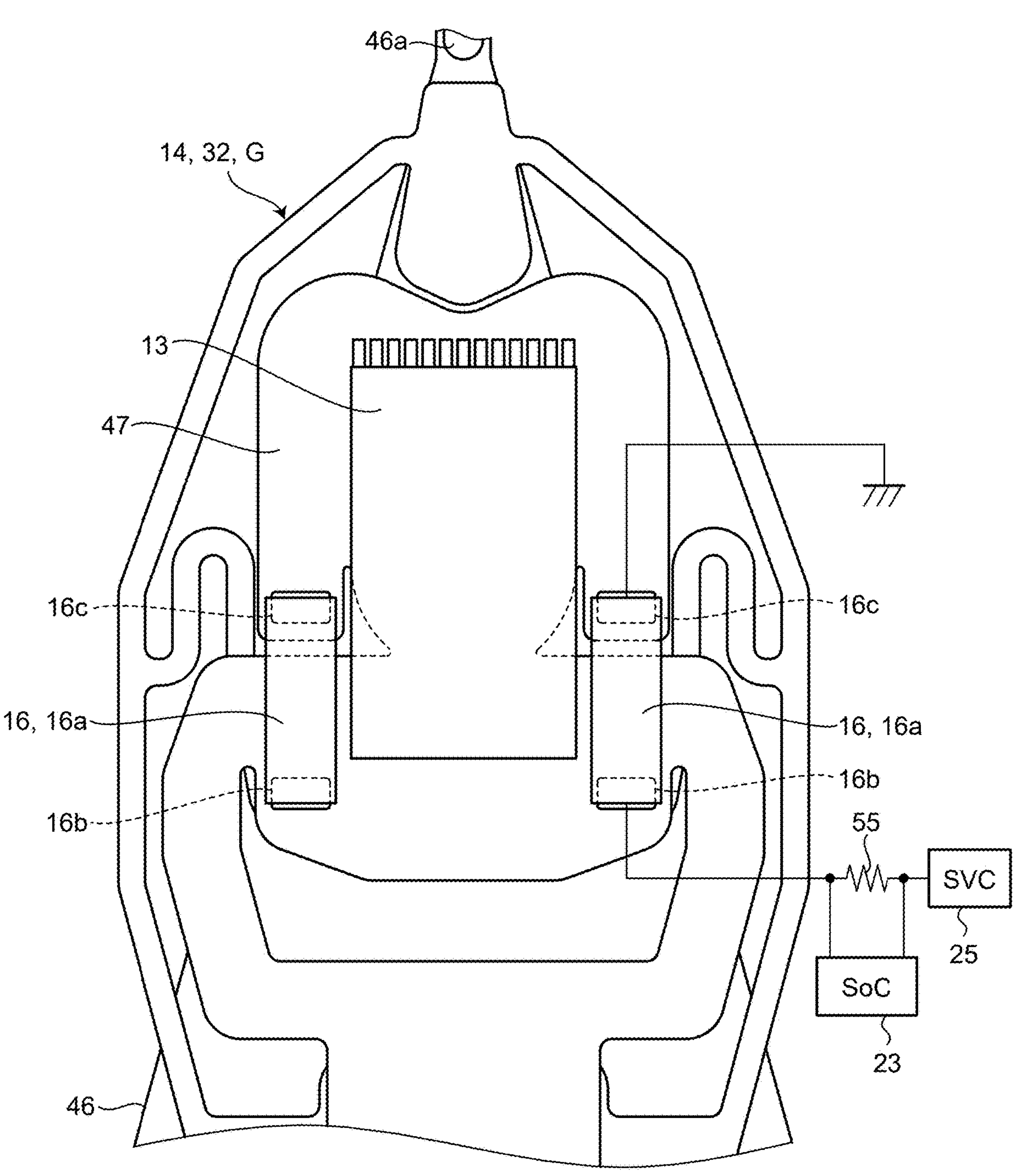
FIG. 3 is an exemplary plan view illustrating a gimbal in the first embodiment.

FIG. 3 is an exemplary plan view illustrating a gimbal G in the first embodiment. As illustrated in FIG. 3, the magnetic disk device 10 is provided with gimbals G which each adjust the position of corresponding one of the magnetic heads 13. Each of the gimbals G includes one of the magnetic heads 13, two or more of the MAs 16, and a part of one of the suspensions 32.

The MAs 16 are mounted on the suspension 32. For example, two MAs 16 are mounted on one suspension 32. In this embodiment, the MAs 16 are mounted on the flexure 47 near the magnetic head 13. However, the MAs 16 are not limited to this example. For example, the MAs 16 may be disposed near the connection between the base plate 45 and the load beam 46.

Each of the MAs 16 includes a piezoelectric body 16*a* and two electrodes 16*b* and 16*c*. The electrodes 16*b* and 16*c* are provided on the surface of the piezoelectric body 16*a* and are distant from each other. The electrode 16*b* is electrically connected to the SVC 25 through the flexure 47. The electrode 16*c* is electrically connected to the load beam 46, for example, through a conductive layer and the backing plate of the flexure 47, and is set to the ground potential. While a voltage is applied to the electrode 16*b*, the MA 16 is deformed due to the inverse piezoelectric effect of the piezoelectric body 16*a*. For example, the piezoelectric body 16*a* expands and contracts in the longitudinal direction of the suspension 32.

The two MAs 16 on the suspension 32 expand and contract individually to bend the suspension 32 substantially in parallel to the recording surface 12*s*. The magnetic head 13 on the flexure 47 of the suspension 32 is moved with respect to the magnetic disk 12 by the deformation of the MAs 16.

As illustrated in FIG. 2, the lift tabs 46*a* of the actuator 14 can be moved along a trajectory T with respect to the recording surfaces 12*s*. The ramp load mechanism 17 is provided on the trajectory T near the outer end of the magnetic disks 12. The central axis Axd of the magnetic disks 12 is positioned near the trajectory T. The actuator 14 allows the lift tabs 46*a* to move between the ramp load mechanism 17 and the central axis Axd.

The ramp load mechanism 17 is distant from the central axis Axd in the first direction Dr1. The ramp load mechanism 17 is used to park the magnetic heads 13 in the unloading time, for example. For example, the ramp load mechanism 17 can support the lift tabs 46*a* of the load beams 46 to hold the actuator 14 and thereby hold the magnetic heads 13 in a retreat position.

The outer stopper 21 and the inner stopper 22 are distant from each other around the central axis Axc. The actuator 14 is positioned between the outer stopper 21 and the inner stopper 22.

When the actuator 14 rotates to a specified position in the first direction Dr1, the actuator 14 is brought into contact with the outer stopper 21. The outer stopper 21 is brought into contact with the actuator 14 to restrict the actuator 14 from rotating in the first direction Dr1. While the actuator 14 is in contact with the outer stopper 21, the ramp load mechanism 17 holds the actuator 14, and the magnetic heads 13 are positioned in the retreat position.

When the actuator 14 rotates to a specified position in the second direction Dr2, the actuator 14 is brought into contact with the inner stopper 22. The inner stopper 22 is brought into contact with the actuator 14 to restrict the actuator 14 from rotating in the second direction Dr2. While the actuator 14 is in contact with the inner stopper 22, the magnetic heads 13 are positioned on the inner peripheral zones 12*si*. In other words, each magnetic head 13 is positioned outside the data zone 12*sd*.

As illustrated in FIG. 1, the SoC 23 includes a Micro-Processing Unit (MPU) 51 and a hard disk controller (HDC) 52. The MPU 51 may also be referred to as a processor.

The MPU 51 operates in accordance with a firmware program. The firmware program is stored in a specified non-volatile storage area. The storage area may be provided by a part of the magnetic disks 12 or may be provided in a read-only memory (ROM) of the SoC 23. The MPU 51 controls the overall operation of the magnetic disk device 10. For example, the MPU 51 controls the HDC 52 and the SVC 25.

The HDC 52 controls sending and receiving of data performed to and from the host 2. The HDC 52 interprets access commands from the host 2 and, on the basis of the interpretation results, executes various kinds of control, such as access to the magnetic disks 12. Specifically, the HDC 52 controls the access to the magnetic disks 12 using the magnetic heads 13 via the read/write channels (RWC) of the SoC 23 and the head amplifier 24.

The head amplifier 24 amplifies signals read by the magnetic heads 13 from the magnetic disks 12, and outputs and supplies the signals to the RWC of the SoC 23. The RWC demodulates the signals supplied from the head amplifier 24 to digital data and supplies this data to the HDC 52.

Further, the head amplifier 24 is supplied with signals corresponding to the digital data, from the RWC. The head amplifier 24 amplifies the signals supplied from the RWC and supplies the signals to the magnetic heads 13. Each of the magnetic heads 13 records the signals supplied from the head amplifier 24, into the data zone 12*sd* of the corresponding magnetic disk 12.

The SVC 25 performs drive control over the SPM 11, the VCM 15, and the MAs 16. Specifically, the SVC 25 drives the VCM 15 and the MAs 16 on the basis of instructions from the MPU 51, and thereby sets each of the magnetic heads 13 at the position instructed by the MPU 51.

The MPU 51 calculates an instruction value of the drive voltage for the VCM 15 and an instruction value of the drive voltage for each MA 16, to cause the position of each magnetic head 13 to follow the target position. The MPU 51 calculates each of the instruction values while using, as a feedback input, the position signal read by the magnetic head 13 from the servo information formed on the recording surface 12*s* of the magnetic disk 12, and transmits each of the instruction values thereby obtained to the SVC 25.

The SVC 25 supplies the VCM 15 with a voltage according to the instruction value of the drive voltage for the VCM 15, and supplies each MA 16 with a voltage according to the instruction value of the drive voltage for the MA 16. Consequently, the magnetic head 13 is set at the target position.

The SVC 25 supplies the electrode 16*b* of each MA 16 with a drive voltage corresponding to the instruction value. The piezoelectric body 16*a* of the MA 16 is deformed by the potential difference between the electrode 16*b* supplied with the drive voltage and the electrode 16*c* set to the ground potential. In other words, the MA 16 is deformed in accordance with the drive voltage applied to the electrode 16*b*. Consequently, the position of the magnetic head 13 is adjusted.

The SVC 25 executes the control over loading/unloading of the actuator 14 by driving the VCM 15 on the basis of instructions from the MPU 51. For the unloading, the SVC 25 drives the VCM 15 to rotate the actuator 14 in the first direction Dr1. Consequently, the lift tabs 46*a* of the load beams 46 are supported by the ramp load mechanism 17, and the magnetic heads 13 are moved away from the magnetic disks 12. For the loading, the SVC 25 drives the VCM 15 to rotate the actuator 14 in the second direction Dr2. Consequently, the lift tabs 46*a* of the load beam 46 are moved away from the ramp load mechanism 17, and the magnetic heads 13 are placed on the recording surfaces 12*s* of the magnetic disks 12.

The SVC 25 drives the SPM 11 on the basis of instructions from the MPU 51. The SVC 25 drives the SPM 11 such that the rotation speed of the SPM 11 is substantially constant at a predetermined target speed.

In the unloading, the ramp load mechanism 17 is brought into contact with the lift tabs 46*a* of the load beams 46. The surface of the ramp load mechanism 17 in contact with the lift tabs 46*a* is made of, for example, a synthetic resin. For this reason, due to friction between the surface of the ramp load mechanism 17 and the lift tabs 46*a*, the ramp load mechanism 17 may be charged with static electricity.

When the ramp load mechanism 17 generates electrostatic discharge (ESD), static electricity flows from the lift tabs 46*a* to the load beams 46. Each of the load beams 46 is connected to the backing plate of the flexure 47 by welding. Further, the backing plate of the flexure 47 is electrically connected to the electrode 16*c* of each MA 16 through a via and a conductive layer of the flexure 47. Therefore, the static electricity is applied to the electrode 16*c*.

When an excessive voltage is applied to an MA 16 due to the ESD, the spontaneous polarization of the MA 16 may disappear or alter. For example, the orientations of the spontaneous polarization of a plurality of crystals of the piezoelectric body 16*a* may become random or may become different from the desired orientations. In this embodiment, the SVC 25 applies a voltage to each MA 16, and thereby gives spontaneous polarization in the desired orientations to the MA 16 again.

As illustrated in FIG. 3, the magnetic disk device 10 further includes a resistor 55. For example, the resistor 55 is provided in a circuit that drives the MAS 16, and is disposed in wiring that connects the SVC 25 to the electrode 16*b* of each MA 16. For example, the SoC 23 checks the current between the resistor 55 and the SVC 25, and the current between the resistor 55 and the electrode 16*b*, and detects the occurrence of ESD on the basis of these currents. It is noted that, the magnetic disk device 10 may detect the occurrence of ESD by another method.

Figure 4:
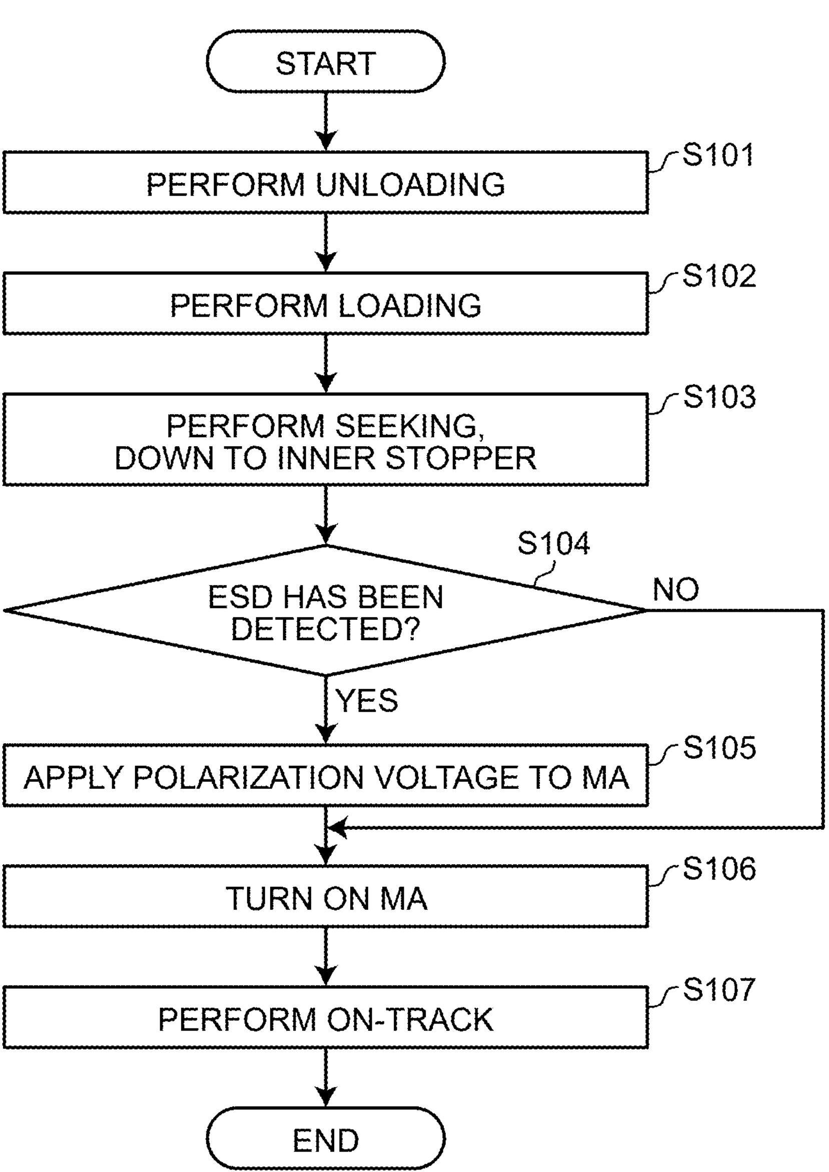
FIG. 4 is an exemplary flowchart illustrating an example of an operation of the magnetic disk device in the first embodiment.

FIG. 4 is an exemplary flowchart illustrating an example of an operation of the magnetic disk device 10 in the first embodiment. With reference to FIG. 4, an explanation will be given below of an example of an operation of repolarization of each MA 16 in this embodiment.

First, the MPU 51 drives the VCM 15 via the SVC 25 to perform unloading control (S101). As the VCM 15 rotates the actuator 14 in the first direction Dr1, the lift tabs 46*a* of the load beams 46 are supported by the ramp load mechanism 17. This unloading control is a type of control performed during the normal operation of the magnetic disk device 10, regardless of the occurrence of ESD. It is noted that, the unloading control is not limited to this example.

Then, the MPU 51 drives the VCM 15 via the SVC 25 to perform loading control (S102). As the VCM 15 rotates the actuator 14 in the second direction Dr2, the actuator 14 which has been held by the ramp load mechanism 17 is moved from the ramp load mechanism 17 in the second direction Dr2, and the magnetic head 13 lands on the recording surfaces 12*s* of the magnetic disks 12.

Then, the MPU 51 drives the VCM 15 via the SVC 25, and performs seeking (movement) until the actuator 14 is brought into contact with the inner stopper 22 (S103). During the period from S101 to S103, the SVC 25 does not drive the MAs 16. It is noted that, the operation of the SVC 25 is not limited to this example.

For example, in the unloading control and loading control described above, ESD may occur due to friction between the surface of the ramp load mechanism 17 and the lift tabs 46*a*. The SoC 23 determines whether ESD has been detected (S104). The SoC 23 checks the occurrence of ESD periodically or during the period from S101 to S103.

When the occurrence of ESD has been detected by the time of S104 (S104: Yes), the SoC 23 transmits a repolarization command to the SVC 25. It is noted that, the SoC 23 may transmit the repolarization command to the SVC 25 before S101 or during the period from S101 to S103.

When the SVC 25 receives the repolarization command from the SoC 23, the SVC 25 applies a polarization voltage to the electrode 16*b* of each MA 16 while the actuator 14 is in contact with the inner stopper 22 (S105). In other words, when static electricity is applied to the MAs 16, the SVC 25 brings the actuator 14 into contact with the inner stopper 22, and applies the polarization voltage to the electrodes 16*b*.

The polarization voltage is a DC bias voltage or a voltage formed of a DC bias voltage superimposed with an AC voltage. The polarization voltage is higher than the drive voltage. Further, the polarization voltage is equal to or greater than the absolute value of a voltage that causes the spontaneous polarization of each MA 16 to disappear.

The SVC 25 applies the polarization voltage to the electrode 16*b* of each MA 16 to give spontaneous polarization to the MAs 16. Specifically, when the polarization voltage is applied to the electrode 16*b*, the orientations of the spontaneous polarization of a plurality of crystals in the piezoelectric body 16*a* become substantially the same. Consequently, the MA 16 obtains spontaneous polarization again. When a drive voltage is applied to the electrode 16*b*, the MA 16 performs desired deformation due to the inverse piezoelectric effect.

The polarization voltage has a specified voltage, amplitude, and frequency. Further, the SVC 25 applies the polarization voltage to the electrode 16*b* for a specified period of time. The voltage, amplitude, frequency, and time are set to values capable of giving spontaneous polarization to the MA 16.

The voltage, amplitude, frequency, and time of the polarization voltage are set to satisfy the following formula (1) and formula (2), for example. It is noted that, the polarization voltage is not limited to this example.

$$\Delta V = (2\pi f)A \cdot \Delta T < \Delta V\text{max} \quad (1)$$

$$T = N/f < T\text{max} \quad (2)$$

In the formula (1) and formula (2) described above, "ΔV" is the voltage change amount of the polarization voltage per unit time, "f" is the frequency of the polarization voltage, "A" is the amplitude of the polarization voltage, "ΔT" is the time resolution of the polarization voltage, "T" is the time in which the polarization voltage is applied to the electrode 16*b*, "N" is the number of cycles with which the polarization voltage is applied to the electrode 16*b*, and "Tmax" is the start-up time of the positioning control of the magnetic head 13 by the MAs 16. The time resolution of the polarization voltage corresponds to the control sampling period of the MAs 16.

In the formula (1) described above, "ΔVmax" is the voltage change amount per unit time that excites the main resonance of the gimbal G in application to the electrode 16*b* of the MA 16. This ΔVmax is set on the basis of experiments, for example.

When the main resonance of the gimbal G is generated, the magnetic head 13 which floats over the magnetic disk 12 may be caused to shake (in the form of pitching) that repeats approaching and receding with respect to the magnetic disk 12. For example, when a voltage whose voltage change amount per unit time is ΔVmax is applied to the electrode 16*b*, the gimbal G causes the magnetic head 13 to generate pitching that may bring the magnetic head 13 into contact with the magnetic disk 12. In this embodiment, the SVC 25 supplies the electrode 16*b* with a polarization voltage that satisfies the formula (1), so as to prevent the main resonance of the gimbal G and thereby to prevent the magnetic head 13 from being brought into contact with the magnetic disk 12.

The magnetic head 13 may be allowed to generate pitching. When the actuator 14 is in contact with the inner stopper 22, the magnetic head 13 is positioned on the inner peripheral zone 12*si* of the magnetic disk 12. Even if the magnetic head 13 is brought into contact with the inner peripheral zone 12*si*, no contact is made with the data zone 12*sd*. Thus, the magnetic head 13 is prevented from damaging the data recorded in the data zone 12*sd*.

After the polarization voltage is applied to each MA 16, or when no ESD has been detected in S104 (S104: No), the MPU 51 controls the SVC 25 to start positioning control of each magnetic head 13 by the MAs 16 (S106).

The SVC 25 applies the polarization voltage to the electrode 16*b* for a period of time that satisfies the formula (2). Accordingly, as soon as the positioning control of each magnetic head 13 by the MAs 16 becomes able to start, the MPU 51 can start this positioning control. Further, as the time for applying the polarization voltage to the electrode 16*b* is set shorter, the performance of the magnetic disk device 10 can be improved.

Then, the SVC 25 drives the VCM 15 to rotate the actuator 14 in the first direction Dr1. Consequently, the actuator 14 is moved away from the inner stopper 22, and each magnetic head 13 is moved from the inner peripheral zone 12*si* to the data zone 12*sd* (on-track) (S107). As a result, the magnetic disk device 10 can adjust the position of each magnetic head 13 by the MAs 16, which have been given the desired spontaneous polarization again.

In the magnetic disk device 10 according to the first embodiment described above, the magnetic disks 12 is configured to rotate around the central axis Axd. The gimbal G includes the magnetic head 13 and the MA 16. The magnetic head 13 is configured to perform recording and reproducing of data with respect to the magnetic disk 12. The MA 16 is configured to be deformed in accordance with an applied drive voltage to move the magnetic head 13. The SVC 25 is configured to apply a polarization voltage to the MA 16 to give spontaneous polarization to the MA 16. The polarization voltage satisfies a relationship of $\Delta V=(2\pi f) A\cdot\Delta T<\Delta V\max$, where "ΔV" is the voltage change amount of the polarization voltage per unit time, "f" is the frequency of the polarization voltage, "A" is the amplitude of the polarization voltage, "ΔT" is the time resolution of the polarization voltage, and "ΔVmax" is the voltage change amount per unit time that excites the resonance of the gimbal G in application to the MA 16.

When an excessive voltage is applied to an MA 16 due to ESD, for example, the spontaneous polarization of the MA 16 may disappear. The SVC 25 can give spontaneous polarization to the MA 16 again by applying the polarization voltage to the electrode 16*b* of the MA 16. Therefore, the magnetic disk device 10 can recover the spontaneous polarization of the MA 16 even if the spontaneous polarization of the MA 16 temporarily disappears, and can thereby adjust the position of each magnetic head 13 more accurately by the MAs 16. In addition, the voltage change amount ΔV per unit time of the polarization voltage is lower than the voltage change amount ΔVmax per unit time that excites the resonance of the gimbal G. Consequently, the magnetic disk device 10 can prevent the magnetic head 13 from being caused to shake that may bring the magnetic head 13 contact with the magnetic disk 12, while the polarization voltage is being applied to the electrode 16*b* of the MA 16. As a result, it is possible to improve the reliability of the magnetic disk device 10.

The polarization voltage satisfies a relationship of $T=N/f<T\max$, where "T" is the time in which the polarization voltage is applied to the MA 16, "N" is the number of cycles with which the polarization voltage is applied to the MA 16, and "Tmax" is the start-up time.

The SVC 25 applies the polarization voltage to the electrode 16*b* of the MA 16 for a time shorter than the start-up time. Thus, the magnetic disk device 10 can give spontaneous polarization to the MA 16 before the magnetic head 13 starts recording and reproducing of data with respect to the magnetic disk 12. Therefore, the magnetic disk device 10 can prevent the time from being extended until the magnetic head 13 starts recording and reproducing of data with respect to the magnetic disk 12, and can adjust the position of the magnetic head 13 by the MA 16 more reliably.

The actuator 14 is configured to rotate around the central axis Axc to move the magnetic heads 13 with respect to the magnetic disks 12. The ramp load mechanism 17 is distant from the central axis Axd in the first direction Dr1 around the central axis Axc, and configured to hold the actuator 14. The inner stopper 22 is configured to be brought into contact with the actuator 14 to restrict the actuator 14 from rotating in the second direction Dr2 opposite to the first direction Dr1. The SVC 25 is configured to apply the polarization voltage to the electrode 16*b* when the actuator 14 is in contact with the inner stopper 22.

When the actuator 14 is in contact with the inner stopper 22, each magnetic head 13 is positioned outside the data zone 12*sd* of the magnetic disk 12. Therefore, even if the MA 16 supplied with the polarization voltage to the electrode 16*b* excites the resonance of the gimbal G, the magnetic disk device 10 can prevent the magnetic head 13 from being brought into contact with the data zone 12*sd* of the magnetic disk 12, thereby improving the reliability.

The SVC 25 is configured to bring the actuator 14 into contact with the inner stopper 22, and apply the polarization voltage to the MA 16, when static electricity is applied to the MA 16.

For example, when the actuator 14 which has been held by the ramp load mechanism 17 is moved, the ramp load mechanism 17 may be charged with static electricity due to friction between the ramp load mechanism 17 and the actuator 14. When ESD is generated, the static electricity of the ramp load mechanism 17 is applied to the electrode 16*c* of the MA 16 through the load beam 46 of the actuator 14 and the backing plate and wiring line of the flexure 47, for example. This static electricity may cause the spontaneous polarization of the MA 16 to disappear. However, in this embodiment, when the static electricity is applied to the MA 16, the SVC 25 applies the polarization voltage to the electrode 16*b* of the MA 16. Consequently, the magnetic disk device 10 can recover the spontaneous polarization of the MA 16 efficiently.

Second Embodiment

Hereinafter, with reference to FIG. 5, a second embodiment will be explained. It should be noted that, in the following description of a plurality of embodiments, the constituent elements having functions substantially the same as those of constituent elements previously described are denoted by reference symbols the same as those for the constituent elements previously described, and, further, their description may be omitted in some cases. Furthermore, a plurality of constituent elements denoted by the same reference symbols are not necessarily the same in all the functions and properties, but may be different in function and/or property as needed for the respective embodiments.

Figure 5:
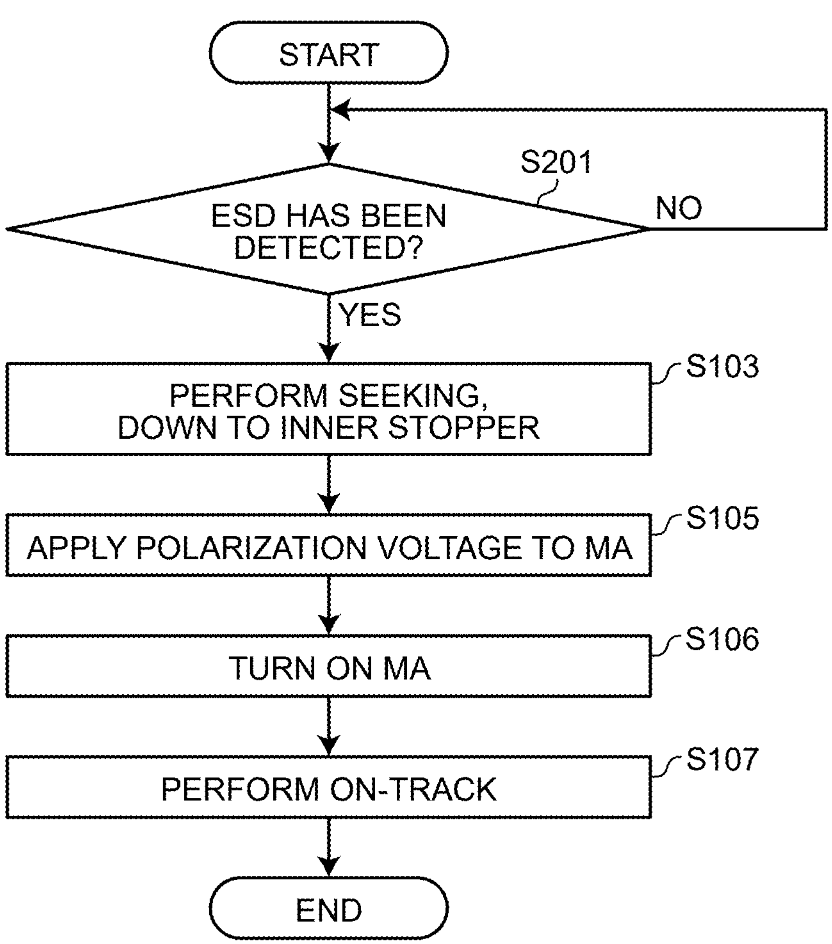
FIG. 5 is an exemplary flowchart illustrating an example of an operation of a magnetic disk device according to a second embodiment.

FIG. 5 is an exemplary flowchart illustrating an example of an operation of a magnetic disk device 10 according to the second embodiment. With reference to FIG. 5, an explanation will be given below of an example of an operation of repolarization of each MA 16 in the second embodiment. In the second embodiment, the magnetic disk device 10 gives spontaneous polarization to each MA 16 again when ESD is detected.

First, the SoC 23 determines whether ESD has been detected (S201). When no ESD has been detected (S201: No), the SoC 23 repeats S201 until ESD is detected.

When the SoC 23 has detected ESD (S201: Yes), the HDC 52 transmits a repolarization command to the SVC 25. In response to the repolarization command, the SVC 25 drives the VCM 15 and performs the seeking until the actuator 14 is brought into contact with the inner stopper 22 (S103).

Then, the SVC 25 applies the polarization voltage to the electrode 16*b* of each MA 16 while the actuator 14 is in contact with the inner stopper 22 (S105). In other words, when static electricity is applied to an MA 16, the SVC 25 brings the actuator 14 in contact with the inner stopper 22, and applies the polarization voltage to the electrode 16*b*. Thereafter, S106 and S107 are executed, as in the first embodiment.

In the magnetic disk device 10 of the second embodiment described above, the SVC 25 is configured to bring the actuator 14 into contact with the inner stopper 22, and apply the polarization voltage to the MA 16, when static electricity is applied to the MA 16. Consequently, the magnetic disk device 10 can recover the spontaneous polarization of the MA 16 efficiently.

Third Embodiment

Figure 6:
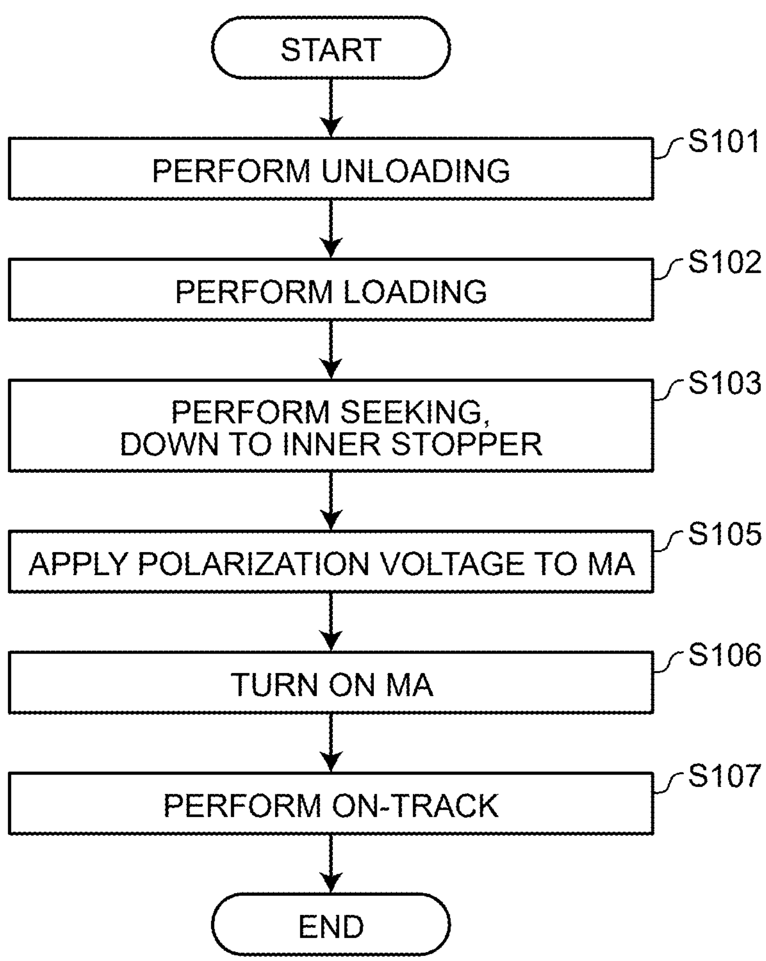
FIG. 6 is an exemplary flowchart illustrating an example of an operation of a magnetic disk device according to a third embodiment.

Hereinafter, with reference to FIG. 6, a third embodiment will be explained. FIG. 6 is an exemplary flowchart illustrating an example of an operation of a magnetic disk device 10 according to the third embodiment. With reference to FIG. 6, an explanation will be given below of an example of an operation of repolarization of each MA 16 in the third embodiment. In the third embodiment, the magnetic disk device 10 gives spontaneous polarization to each MA 16 again in the loading/unloading time.

As in the first embodiment, the MPU 51 performs the unloading control of S101, the loading control of S102, and the seeking control down to the inner stopper 22 of S103. When the actuator 14 is brought into contact with the inner stopper 22, the HDC 52 transmits a repolarization command to the SVC 25.

When the SVC 25 receives the repolarization command from the HDC 52, the SVC 25 applies the polarization voltage to the electrode 16*b* of each MA 16 while the actuator 14 is in contact with the inner stopper 22 (S105). Specifically, when the actuator 14 which has been held by the ramp load mechanism 17 is moved from the ramp load mechanism 17 in the second direction Dr2, the SVC 25 brings the actuator 14 into contact with the inner stopper 22, and applies the polarization voltage to the electrode 16*b*. Thereafter, S106 and S107 are executed, as in the first embodiment.

In the magnetic disk device 10 of the third embodiment described above, the SVC 25 is configured to bring the actuator 14 into contact with the inner stopper 22, and apply the polarization voltage to the MA 16, when the actuator 14 is moved from the ramp load mechanism 17 in the second direction Dr2.

For example, in a case where the polarization voltage is applied to the electrode 16*b* of the MA 16 while the actuator 14 is being held by the ramp load mechanism 17, there is a possibility that the spontaneous polarization of the MA 16 disappears due to ESD before the actuator 14 is separated from the ramp load mechanism 17. However, the SVC 25 applies the polarization voltage to the electrode after the actuator 14 has separated from the ramp load mechanism 17 and been brought into contact with the inner stopper 22. Consequently, the magnetic disk device 10 can prevent the spontaneous polarization of each MA 16 from disappearing again.

Fourth Embodiment

Figure 7:
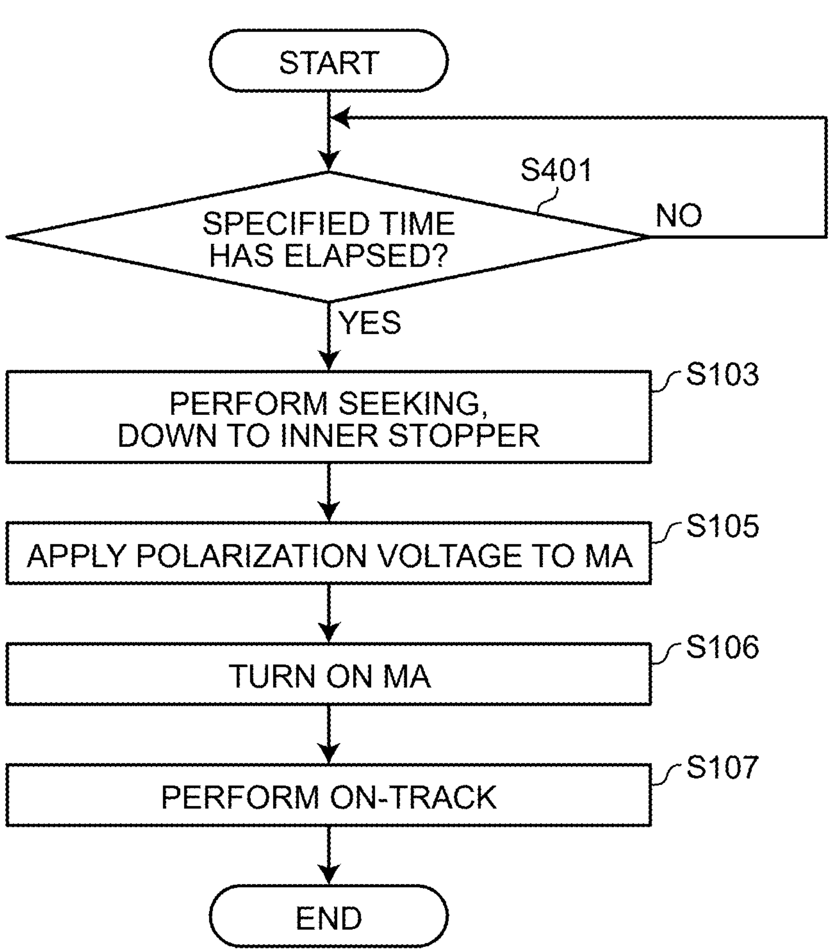
FIG. 7 is an exemplary flowchart illustrating an example of an operation of a magnetic disk device according to a fourth embodiment.

Hereinafter, with reference to FIG. 7, a fourth embodiment will be explained. FIG. 7 is an exemplary flowchart illustrating an example of an operation of a magnetic disk device 10 according to the fourth embodiment. With reference to FIG. 7, an explanation will be given below of an example of an operation of repolarization of each MA 16 in the fourth embodiment. In the fourth embodiment, the magnetic disk device 10 gives spontaneous polarization to each MA 16 again at constant time intervals.

First, the HDC 52 determines whether a specified time has elapsed (S401). When the specified time has not elapsed (S401: No), the HDC 52 repeats S401 until the specified time has elapsed.

When the specified time has elapsed (S401: Yes), the HDC 52 transmits a repolarization command to the SVC 25. In response to the repolarization command, the SVC 25 drives the VCM 15 and performs the seeking (movement) until the actuator 14 is brought into contact with the inner stopper 22 (S103). It is noted that, when the magnetic head 13 is accessing the magnetic disk 12, the MPU 51 may perform the seeking control after this access is completed.

Then, the SVC 25 applies the polarization voltage to the electrode 16*b* of each MA 16 while the actuator 14 is in contact with the inner stopper 22 (S105). In other words, at constant time intervals, the SVC 25 brings the actuator 14 into contact with the inner stopper 22 and applies the polarization voltage to the electrode 16*b*. Thereafter, S106 and S107 are executed, as in the first embodiment.

In the magnetic disk device 10 of the fourth embodiment described above, at constant time intervals, the SVC 25 brings the actuator 14 into contact with the inner stopper 22, and applies the polarization voltage to the MA 16. Consequently, the magnetic disk device 10 can periodically recover the spontaneous polarization of the MA 16, thereby improving the reliability.

In each of the embodiments described above, the polarization voltage is used to give spontaneous polarization again to the MAs 16 that have lost the desired spontaneous polarization due to ESD. However, the polarization voltage is not limited to this example. For example, the polarization voltage may be used to give spontaneous polarization to the MAs 16 that have lost the desired spontaneous polarization due to another reason.

Further, in each of the plurality of embodiments described above, the SVC 25 brings the actuator 14 into contact with the inner stopper 22 and applies the polarization voltage to each electrode 16*b*. However, the SVC 25 may apply the polarization voltage to each electrode 16*b*, when the actuator 14 is separated from the inner stopper 22 and each magnetic head 13 is positioned on the data zone 12*sd* or the outer peripheral zone 12*so*, or when the magnetic heads 13 are positioned away from the magnetic disks 12.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:

a magnetic disk configured to rotate around a first axis;

a gimbal that includes a magnetic head configured to perform recording and reproducing of data with respect to the magnetic disk, and a piezoelectric element configured to be deformed in accordance with an applied drive voltage to move the magnetic head;

a controller configured to apply a polarization voltage to the piezoelectric element to give spontaneous polarization to the piezoelectric element;

an actuator configured to rotate around a second axis to move the magnetic head with respect to the magnetic disk;

a ramp distant from the first axis in a first direction around the second axis, and configured to hold the actuator; and a stopper configured to be brought into contact with the actuator to restrict the actuator from rotating in a second direction opposite to the first direction, wherein the polarization voltage satisfies a relationship of $\Delta V=(2\pi f)A\cdot\Delta T<\Delta V\text{max}$, where "ΔV" is a voltage change amount of the polarization voltage per unit time, "f" is a frequency of the polarization voltage, "A" is an amplitude of the polarization voltage, "ΔT" is a time resolution of the polarization voltage, and "ΔVmax" is a voltage change amount per unit time that excites resonance of the gimbal in application to the piezoelectric element, and the controller is configured to apply the polarization voltage to the piezoelectric element when the actuator is in contact with the stopper.

2. The magnetic disk device according to claim 1, wherein the polarization voltage satisfies a relationship of $T=N/f<T\text{max}$, where "T" is a time in which the polarization voltage is applied to the piezoelectric element, "N" is a number of cycles with which the polarization voltage is applied to the piezoelectric element, and "Tmax" is a start-up time.

3. The magnetic disk device according to claim 1, wherein the controller is configured to bring the actuator into contact with the stopper and apply the polarization voltage to the piezoelectric element, when static electricity is applied to the piezoelectric element.

4. The magnetic disk device according to claim 1, wherein the controller is configured to bring the actuator into contact with the stopper and apply the polarization voltage to the piezoelectric element, at constant time intervals.

5. The magnetic disk device according to claim 1, wherein the controller is configured to bring the actuator into contact with the stopper and apply the polarization voltage to the piezoelectric element, when the actuator is moved from the ramp in the second direction.

6. The magnetic disk device according to claim 1, wherein the polarization voltage has a DC bias voltage, or a voltage formed of a DC bias voltage superimposed with an AC voltage.

7. The magnetic disk device according to claim 1, wherein the polarization voltage is higher than the drive voltage.

8. The magnetic disk device according to claim 1, wherein the polarization voltage is equal to or greater than an absolute value of a voltage that causes spontaneous polarization of the piezoelectric element to disappear.

9. A magnetic disk device comprising:

a magnetic disk configured to rotate around a first axis;

a gimbal that includes a magnetic head configured to perform recording and reproducing of data with respect to the magnetic disk, and a piezoelectric element configured to be deformed in accordance with an applied drive voltage to move the magnetic head;

an actuator configured to rotate around a second axis to move the magnetic head with respect to the magnetic disk;

a ramp distant from the first axis in a first direction around the second axis, and configured to hold the actuator;

a stopper configured to be brought into contact with the actuator to restrict the actuator from rotating in a second direction opposite to the first direction; and a controller configured to apply a polarization voltage to the piezoelectric element to give spontaneous polarization to the piezoelectric element, when the actuator is brought into contact with the stopper.

* * * * *